United States Patent
Pearson et al.

(10) Patent No.: US 12,150,601 B2
(45) Date of Patent: Nov. 26, 2024

(54) LAVATORY HAND DRYER

(71) Applicant: B/E Aerospace, Inc., Winston Salem, NC (US)

(72) Inventors: Matthew Robert Pearson, Hartford, CT (US); Brian St. Rock, Andover, CT (US); Jefferey M. McKee, Duvall, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 740 days.

(21) Appl. No.: 17/352,082

(22) Filed: Jun. 18, 2021

(65) Prior Publication Data

US 2022/0400910 A1    Dec. 22, 2022

(51) Int. Cl.
| | |
|---|---|
| *A47K 10/48* | (2006.01) |
| *B64D 11/02* | (2006.01) |
| *B64D 13/06* | (2006.01) |
| *E03C 1/01* | (2006.01) |
| *E03C 1/18* | (2006.01) |

(52) U.S. Cl.
CPC .............. *A47K 10/48* (2013.01); *B64D 11/02* (2013.01); *B64D 13/06* (2013.01); *E03C 1/01* (2013.01); *E03C 1/18* (2013.01); *B64D 2013/0618* (2013.01); *B64D 2013/0651* (2013.01); *B64D 2013/0662* (2013.01)

(58) Field of Classification Search
CPC ........ A47K 10/48; B64D 11/02; B64D 13/06; B64D 2013/0651; B64D 2013/0662; B64D 2013/0618; E03C 1/18; E03C 1/01
USPC ........................................................... 34/487
See application file for complete search history.

(56) References Cited

U.S. PATENT DOCUMENTS

| | | | | |
|---|---|---|---|---|
| 5,031,337 A | * | 7/1991 | Pilolla .................... | A47K 10/48 34/526 |
| 5,651,189 A | * | 7/1997 | Coykendall ........... | F26B 21/001 34/91 |
| 6,038,786 A | * | 3/2000 | Aisenberg .............. | A47K 10/48 34/267 |
| 6,443,393 B1 | * | 9/2002 | Ooi ..................... | B64D 11/0626 244/1 R |
| 8,141,185 B2 | | 3/2012 | Hoffjann et al. | |

(Continued)

FOREIGN PATENT DOCUMENTS

| | | | | |
|---|---|---|---|---|
| EP | 1909625 A1 | | 4/2008 | |
| EP | 4104728 A1 | * | 12/2022 | ............. A47K 10/48 |

(Continued)

OTHER PUBLICATIONS

Extended European Search Report for European Patent Application No. EP22179734.3, dated Oct. 20, 2022.

(Continued)

*Primary Examiner* — Stephen M Gravini
(74) *Attorney, Agent, or Firm* — SNELL & WILMER L.L.P.

(57) ABSTRACT

A hand drying system for an aircraft lavatory includes a hand blower tap with an inlet configured to connect to an aircraft environmental control system (ECS) to receive a flow of conditioned air from the ECS. A valve is operatively connected to the inlet to selectively block flow from the ECS and allow flow from the ECS through the hand blower tap.

8 Claims, 2 Drawing Sheets

(56) References Cited

U.S. PATENT DOCUMENTS

| | | | |
|---|---|---|---|
| 8,347,522 B2* | 1/2013 | Dyson | A47K 10/48 34/104 |
| 8,623,559 B2* | 1/2014 | Frahm | H01M 8/04126 429/408 |
| 9,062,909 B2* | 6/2015 | Lu | F25D 17/06 |
| 9,139,302 B2 | 9/2015 | Dehn et al. | |
| 10,264,931 B2 | 4/2019 | Childress | |
| 10,315,769 B2* | 6/2019 | Ooi | B64D 11/02 |
| 10,455,992 B2 | 10/2019 | Satermo | |
| 2002/0109046 A1 | 8/2002 | Ooi et al. | |
| 2012/0210509 A1 | 8/2012 | Dehn et al. | |
| 2017/0210473 A1 | 7/2017 | Ooi et al. | |
| 2018/0251964 A1 | 9/2018 | Chung | |
| 2021/0289996 A1* | 9/2021 | Yoo | B01D 5/0027 |
| 2022/0400910 A1* | 12/2022 | Pearson | A47K 10/48 |
| 2024/0109660 A1* | 4/2024 | Kandukuri | B64D 11/02 |

FOREIGN PATENT DOCUMENTS

| | | | | |
|---|---|---|---|---|
| KR | 2006019298 A * | 3/2006 | | A47K 10/48 |
| WO | WO-02063991 A1 * | 8/2002 | | A45D 20/12 |

OTHER PUBLICATIONS

European Patent Office, European Office Action dated Jun. 11, 2024 in Application No. 22179734.3.

* cited by examiner

LAVATORY HAND DRYER

BACKGROUND

1. Field

The present disclosure relates generally to aircraft lavatories, and more particularly to hand dryers for aircraft lavatories.

2. Description of Related Art

Paper towels are the primary hand drying method for typical aircraft lavatories. Paper towels create litter within the lavatory that must be cleared up periodically by flight attendants on long flights. Airlines desire a litter-free hand drying alternative such as air dryers. Typical air dryers have their own limitations. There is a hygiene risk if droplets of water on poorly-washed hands are turned to aerosol. Water can splatter on floor, walls, and other lavatory surfaces. Also, power needs for air fan and/or heater can exceed power available to a typical aircraft lavatory.

While considered satisfactory for their intended purposes, typical hand drying methods leave an ongoing need for improved methods. This disclosure provides a solution for this need.

SUMMARY

A hand drying system for an aircraft lavatory includes a hand blower tap with an inlet configured to connect to an aircraft environmental control system (ECS) to receive a flow of conditioned air from the ECS. A valve is operatively connected to the inlet to selectively block flow from the ECS and allow flow from the ECS through the hand blower tap.

In embodiments, the hand blower tap can include an outlet directed to blow in an air flow direction, wherein the system is devoid of an air intake opposite the hand blower tap relative to the air flow direction. In embodiments, inlet can be connected to an ECS supply duct. In certain embodiments, the inlet can be connected to an gasper system of the ECS.

In embodiments, a source of the flow of conditioned air is engine bleed air. In embodiments, the inlet can be connected to a source of air pressurized at 0.25 to 0.5 psi (1724 Pa to 3447 Pa), or the inlet can be connected to a source of air pressurized at 0.25 to 1 psi (1724 Pa to 6895 Pa). In embodiments, an amount of water shed can be reduced by about 80 percent. In embodiments, a noise level of the hand drying system can be about 65-70 dB.

In certain embodiments, a humidity filter disposed in a line upstream of the outlet for lowering a relative humidity of the flow of air. In certain embodiments, the humidity filter is a high-efficiency particulate absorbing (HEPA) filter.

In certain embodiments, a hand drying system for an aircraft lavatory can include a hand blower tap with an inlet connected to a source of conditioned air and a valve operatively connected to the inlet to selectively block flow from the source of conditioned air and allow flow from the source of conditioned air through the hand blower tap. In certain such embodiments, the conditioned flow through the hand blower tap can be of a relatively humidity of 10 percent or less such that a humidity filter is not required The hand blower tap, valve, and source of conditioned air can be configured to issue a flow of air from the hand blower tap with a flow velocity less than 200 m/s. In embodiments, the flow of air from the hand blower tap can have a velocity between 25 and 50 m/s.

In certain embodiments, a heating element can be disposed in the hand blower tap for heating the flow of air through the hand blower tap. A power output of the heating element can be less than 100 watts.

In accordance with another aspect of this disclosure, a method includes issuing a flow of air from an aircraft environmental control system (ECS) through a hand blower tap in an aircraft lavatory onto a passenger's wet hands, wherein the flow is maintained below 200 m/s, and completely drying the passenger's hands in 20 seconds or less. In embodiments, the method can include heating the flow of air through the hand blower tap. In certain embodiments, the method can further include filtering the flow of air with a humidity filter disposed in the ECS for lowering a relative humidity of the flow of air.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
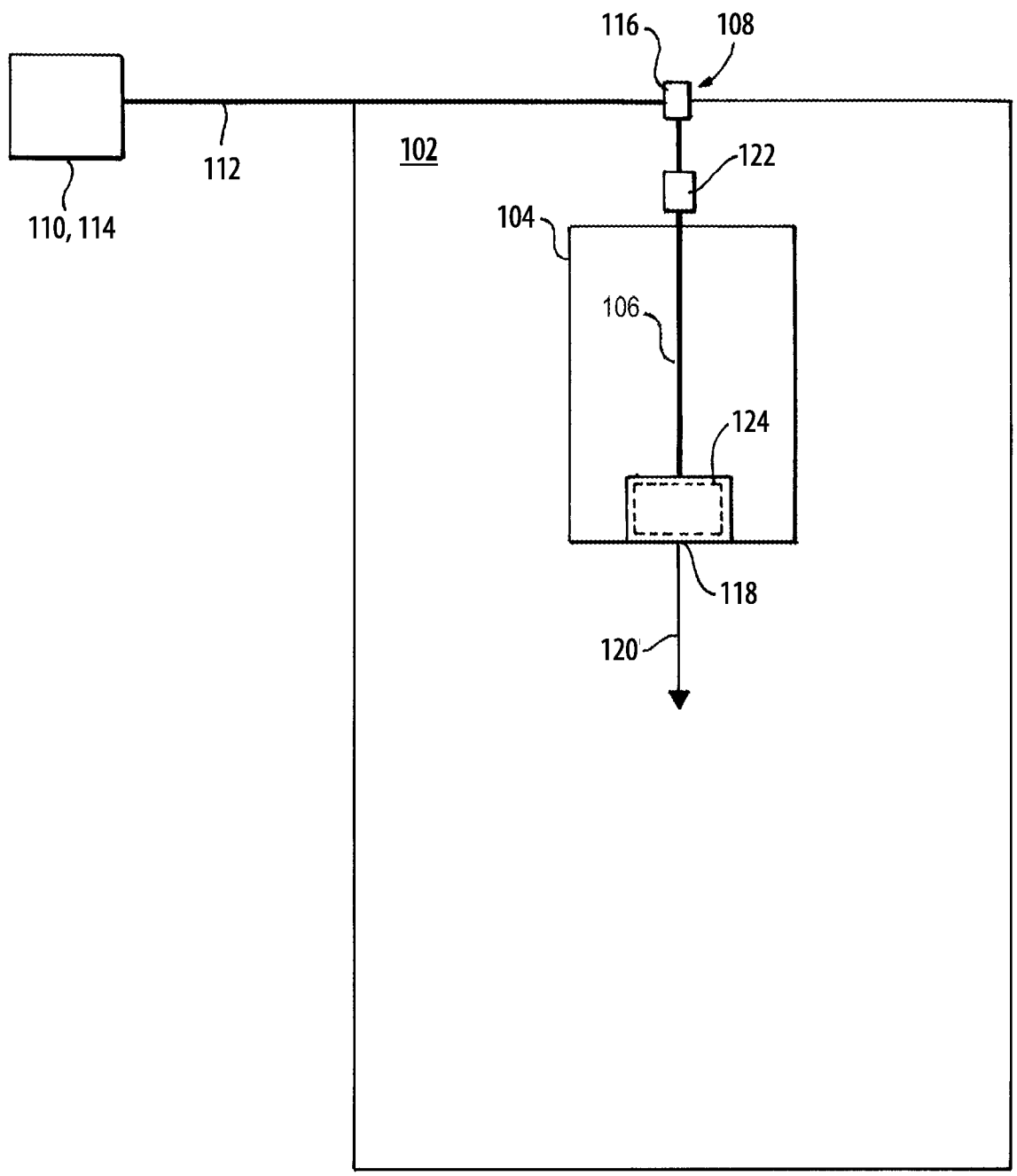
FIG. 1 is a schematic perspective view of an embodiment of a hand drying system constructed in accordance with the present disclosure, showing a connection of the hand drying system to an environmental control system.
Figure 2:
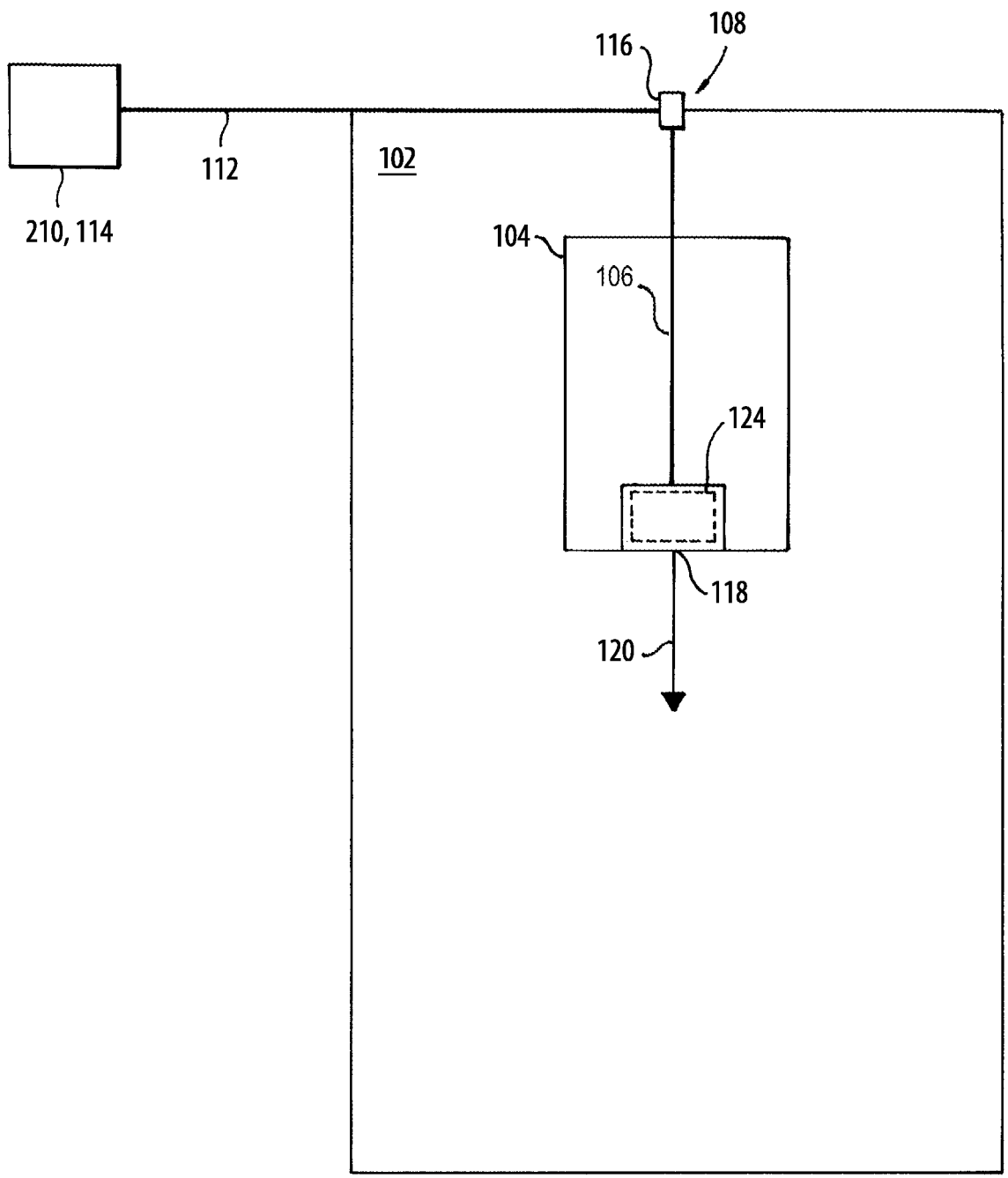
FIG. 2 is another embodiment of the hand drying system of FIG. 1.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2 as will be described. The systems and methods described herein can be used to provide for litter-free hand drying that reduces or eliminates splatter, e.g. in aircraft lavatories, relative to traditional blower-type hand drying systems. This can provide for cleaner, more sanitary lavatories, and can help reduce the spread of contagions.

In accordance with at least one aspect of this disclosure, a hand drying system 100 for an aircraft lavatory 102 includes a hand dryer 104. The hand dryer 104 can be fed by a hand blower tap 106 having an inlet 108 configured to connect to an aircraft environmental control system (ECS) 110. The hand blower tap 106 can be a conduit or any other suitable means for conveying a flow of pressurized air from the ECS 110. The inlet 108 receives a flow of conditioned air from the ECS 110, for example from an ECS duct 112. For example, the source of pressurized flow for the ECS 110 and hand blower tap 106 can be provided in large part by engine bleed, and can be recirculated throughout an aircraft cabin with blowers.

In certain embodiments, the inlet 108 can be connected to a gasper system 114 of the ECS 110. Connecting the hand drying system 100 to the ECS 110 and/or the gasper circuit 114 eliminates the need for a separate air supply (e.g. additional fans), which can reduce the weight, size, and noise level (e.g. 65-70 dB or less) of the hand drying system 100.

A valve 116 is operatively connected to the inlet 108 to selectively block flow from the ECS 110 and allow flow from the ECS 110 through the hand blower tap 106. In embodiments, the valve 116 can be controlled manually, for example with a push button, or operated through a motion sensor so that touch free operation of the hand drying system is possible. An outlet 118 of the hand blower tap 106 can be directed to blow in an air flow direction 120, e.g. directing air downward onto wet hands of a user in the aircraft lavatory 102. The system need not include an air intake opposite the hand blower tap 106 relative to the air flow direction 120.

In embodiments, the outlet 118 can be connected to a source of air pressurized at 0.25 to 0.5 psi (1724 Pa to 3447 Pa), or the inlet can be connected to a source of air pressurized at 0.25 to 1 psi (1724 Pa to 6895 Pa). A humidity filter 122 can be disposed in a hand blower tap 106 upstream of the outlet 118 for lowering a relative humidity of the flow of the air flowing through the outlet 118 and the hand blower tap 106. In certain embodiments, the humidity filter 122 can be a high-efficiency particulate absorbing (HEPA) filter, or the filter can be a desiccant dehumidifier to remove excess moisture from the air, decreasing the drying time. In certain embodiments, a heating element 124 can be in the hand blower tap 106 for heating the flow of air through the hand blower tap 106. The heating element 124 can be a low power heating element, for example outputting less than 100 watts. Heating the air can decrease drying time further, as well as make the air more comfortable for a passenger's hands. It is contemplated that other air treatments may be applied in addition to heating and drying the air, for example scenting the air.

The hand blower tap 106, valve 116, and the flow of conditioned air can be configured to issue the flow of air from the blower 106 with a flow velocity less than 200 m/s to dry the passenger's hands in less than 20 seconds. For example if the heating element 124 is not activated, 20 second drying time can be achieved with an air velocity between 100 and 120 m/s. When the heating element 124 is active, 20 second drying time can be achieved with an air velocity between 20-50 m/s. However it is possible that a low humidity, low velocity heated air flow can have a drying time of between 10-15 seconds. The low velocity air can decrease the amount of water shed from the passengers hands by about 80 percent as compared to a conventional hand dryer (e.g. a dryer on the ground), decreasing the amount of water that may puddle or splatter beneath the dryer 104.

In certain embodiments, a hand drying system 200 can have similar elements to that described with respect to system 100. For brevity, the description of common elements that have been described above are not repeated. The system 200 can be connected to a source of conditioned air 210 external to the ECS 110, for example by feeding the hand blower tap 106 from a flow of air directly from an ambient environment, e.g. fresh air from outside an aircraft cabin. Because the source of air 210 from the atmosphere is already very low humidity, the system 200 does not require any humidity filter in the hand blower tap 106.

In accordance with another aspect of this disclosure, a method includes issuing a flow of air from an aircraft environmental control system (ECS) 110 (or other source of conditioned air 210) through a hand blower tap 106 in an aircraft lavatory 102 onto a passenger's wet hands, the flow being maintained below 200 m/s, and completely drying the passenger's hands in 20 seconds or less. In embodiments, the method can include heating the flow of air through the hand blower tap 106 (e.g. with heating element 124). In certain embodiments, the method can further include filtering the flow of air with a humidity filter (e.g. filter 122) disposed in the ECS 110 for lowering a relative humidity of the flow of air, if needed.

The methods and systems of the present disclosure, as described above and shown in the drawings, provide for a blower-free hand drying system which is more efficient and more hygienic hand drying. While the apparatus and methods of the subject disclosure have been shown and described, those skilled in the art will readily appreciate that changes and/or modifications may be made thereto without departing from the scope of the subject disclosure.

What is claimed is:

1. A hand drying system for an aircraft lavatory comprising:
   a hand blower tap with an inlet configured to connect to an aircraft environmental control system (ECS) gasper circuit via a duct to receive a flow of conditioned air from the ECS gasper circuit; and
   a valve operatively connected to the inlet to selectively block flow from the ECS and allow flow from the ECS through the hand blower tap.

2. The hand drying system as recited in claim 1, wherein the hand blower tap includes an outlet to direct the flow of conditioned air in an air flow direction, wherein the system is devoid of an air intake opposite the blower tap relative to the air flow direction, and wherein the hand blower tap is configured to issue a flow of air from the hand blower tap with a flow velocity less than 200 m/s.

3. The hand drying system as recited in claim 1, wherein the inlet is connected to an ECS supply duct.

4. The hand drying system as recited in claim 1, wherein a source of the flow of conditioned air is engine bleed air.

5. The hand drying system as recited in claim 1, wherein an amount of water shed is reduced by about 80 percent.

6. The hand drying system as recited in claim 1, wherein a noise level of the hand drying system is about 65-70 dB.

7. The hand drying system as recited in claim 1, further comprising a humidity filter disposed in a line upstream of the outlet for lowering a relative humidity of the flow of air.

8. The hand drying system as recited in claim 7, wherein the humidity filter is a high-efficiency particulate absorbing (HEPA) filter.

* * * * *